United States Patent [19]
Sijbring

[11] 3,812,775
[45] May 28, 1974

[54] PROCESS AND APPARATUS FOR PREPARING FRIED EDIBLE PRODUCTS

[75] Inventor: Pieter Herman Sijbring, Rhenen, Netherlands

[73] Assignee: Instituent Voor Bewaring En Verwerking Van Landbouxprodukten, Wageningen, Netherlands

[22] Filed: Mar. 9, 1972

[21] Appl. No.: 233,373

Related U.S. Application Data
[62] Division of Ser. No. 850,290, July 7, 1969, Pat. No. 3,687,679.

[30] Foreign Application Priority Data
Oct. 29, 1968 Great Britain.................... 51301/68
Oct. 28, 1966 Netherlands...................... 6615316

[52] U.S. Cl.................... 99/404, 99/407, 99/443 C
[51] Int. Cl. .......................................... A47j 37/12
[58] Field of Search ............. 99/404, 330, 336, 355, 99/359, 403, 405, 406, 407, 408, 409, 443 C, 410, 353

[56] References Cited
UNITED STATES PATENTS
1,401,945  12/1921  Morris ................................. 99/406
1,440,663  1/1923   Dunn .................................. 99/406
2,853,937  9/1958   Peck .................................. 99/404
3,209,678  10/1965  Benson et al. ........................ 99/406
3,234,869  2/1966   Porambo............................... 99/353
3,446,138  5/1969   Hasten et al......................... 99/404
3,472,155  10/1969  Cardis et al......................... 99/404
3,641,923  2/1972   Wilkinson............................ 99/404

Primary Examiner—Peter Feldman
Assistant Examiner—Arthur O. Henderson
Attorney, Agent, or Firm—Arnold Robinson; William D. Lucas; Frank J. DeRosa

[57] ABSTRACT

Edible products formed from compositions comprising edible starch materials and containing a sugar are fried in a two-stage operation in an oil such as peanut oil. In the first stage the frying is continued until the moisture content drops to 5 to 20 percent by weight. In the second stage the frying is done under reduced pressure at a temperature of not more than 100°C. and is continued until the moisture content is not more than 2.5 percent by weight.

A suitable oven for carrying out the second stage consists of a closed housing, supply and discharge sluices, suction means for drawing off water vapor and to keep the pressure below atmospheric, conveyor means for moving the edible product toward the discharge outlet and means for removing the fried edible product from the oil before such product reaches the discharge sluice.

8 Claims, 7 Drawing Figures

PROCESS AND APPARATUS FOR PREPARING FRIED EDIBLE PRODUCTS

This is a division of application Ser. No. 850,296, filed July 7, 1969 now Pat. No. 3,687,679, which is a continuation-in-part application of Ser. No. 677,634 filed Oct. 24, 1967, now abandoned, in the name of Pieter Herman Sijbring for Process and Apparatus for Preparing Fried Potatoes.

BACKGROUND OF THE INVENTION

It is common knowledge to fry certain edible products in oil. For example, it is well known to fry cut potatoes in oil in so-called "chips" (in England called "crisps") and "sticks". It is also known that these fried products frequently have a dark brown color, which makes them unattractive and unfit for sale. This brown discoloration which occurs during the frying process, is darker the higher the content in the potatoes used, of reducing sugar. Unripe potatoes and ripe potatoes, stored at a low temperature until the following spring are, therefore, in general, less suitable as starting material than freshly harvested, ripe potatoes. The growing and ripening conditions, however, also play a part, so that even with freshly harvested, ripe potatoes the reducing sugar content may vary from one season to another. In the literature the brown discoloration of products containing proteins and reducing sugars is attributed to the so-called Maillard reaction.

It is known to avoid an excessive discoloration of the fried product by carrying out the frying process in two stages. In the first stage the potato cuttings are fired in oil until the product has a moisture content between 20 and 5 percent, while in the second stage the water content of the pre-fried product after removal from the oil, is decreased to about 2.5 percent by the combined action of hot air and high-frequency heating.

This prior art process has some disadvantages. The second stage of the frying process is expensive owing to the costly equipment employed, but particularly in consequence of the high power consumption; moreover, careful operation and expert maintenance are required. Further, not all the cuttings have the same moisture content after the pre-frying process. Although the drying effect of the high-frequency field is greater on cuttings with a higher moisture content, this effect is not such that differences in moisture content are leveled out sufficiently, thus yielding a final product having an unequal moisture content and color. In order to cope with this phenomenon, it is necessary for those cuttings which are too wet to be removed before or after passing through the after-frying apparatus. Moreover, the discoloration becomes very uneven when the high-frequency field is not homogeneous. Furthermore, the duration of the after-frying process in the high-frequency field should be accurately controlled, because with increasing duration of the treatment the water content decreases very slowly indeed below about 2.5 percent by weight, but the discoloration increases more and more.

SUMMARY OF THE INVENTION

The invention relates to a process for the preparation of a fried edible product in two stages, according to which process the edible product bodies are fried in the first stage in oil to a moisture content of 5–20 percent by weight, after which the pre-fried bodies are further fried in the second stage under reduced pressure and at a temperature not exceeding 100°C. until the product has a moisture content not exceeding 2.5 percent by weight.

The invention further relates to an oven for frying edible product bodies under reduced pressure. The oven consists of a closed housing with at least one supply sluice and at least one discharge sluice for the supply and discharge of product bodies into and from the housing. A suction pipe is provided to aspirate water vapor from the oven and to maintain a reduced pressure therein. A conveyor means moves the product bodies in the direction of the discharge sluice and pushes them into oil contained in the housing. Means are provided for removing the product bodies from the oil before they enter the discharge sluice and further means are provided for supplying, discharging, and circulating oil in the housing.

DESCRIPTION OF THE INVENTION

By way of example the aforesaid background and prior art description pertains to potatoes; however, the invention is intended to also cover other starch materials containing either natural sugars or sugars deliberately added to improve the flavor. The following are examples of products which may be used as starting materials: potatoes, potato derivative products such as mashed potatoes, dried potato powder or small pieces of potato, milled cereal grain, potato starch, cereal grain starch and mixtures of any of these.

When the starting material is a potato derivative product, it already contains some sugars so that it is not essential to add an additional sugar. When the starting material consists wholly of starches some sugars must be included. In this latter connection it is to be observed that in the absence of sugars, the problem of considerable discoloration in frying does not normally occur. The starches may be used both in the gelatinized and the ungelatinized state.

In order to be able to shape the starting materials as required for frying, in slices or sticks, the starting materials may, if desired, be mixed with water or other suitable liquid such as milk, to form a stiff paste. In order to aid in obtaining a stiff paste condition, binding agents may be added, e.g. methycellulose, polygalactomannan gum (guar gum), locust bean gum, and waxy maize starch. In order to improve the rheological properties of the mass, monoglycerides may be added. Flavoring may be added as required. The shaped bodies for the frying operation may conveniently be produced from such stiff paste products by moulding or extrusion process. The process according to the invention can be carried out in the oven hereinafter described.

It has been found that the disadvantages of the known process heretofore described can be avoided and a final product with an attractive color obtained, when the pre-fried product bodies are fried in the second stage in oil at a temperature not exceeding 100°C. and under reduced pressure. It is surprising that the combination of reduced pressure and a temperature not exceeding 100°C. does not cause intense discoloration of the fired product, since it has appeared from experiments that not only at a high frying temperature of 190°C. but even at a low frying temperature of 110°C. when the product is fired in oil in one stage, there is a tendency for the color of the fried product to grow darker as the moisture content decreases. In the process according to this invention the frying in the first stage is effected at a temperature of between 110°C. and 190°C. until the desired attractively colored or golden brown product is obtained yielding product bodies with a moisture content of 5–20 percent by weight. During the after-frying in the second stage, according to the invention, the color of the product hardly changes, if at all.

In the second stage the frying preferably takes place at a temperature of 60°–95°C. At a frying temperature below 60°C. the frying takes a considerable time to attain the desired low moisture content. It is effective that, for the after-frying, the pressure does not exceed 500 mm of mercury absolute, while preferably it is from 50 to 100 mm of mercury absolute.

In order to obtain a palatable and crisp product it is necessary to effect the frying in the second stage in oil.

It is a great advantage of the process according to the invention that the duration of the after-frying need not be accurately controlled. Since during the after-frying the color hardly changes any further and it is very difficult to obtain a moisture content below about 1.5 percent by weight, the risk that the frying time selected for the second stage be too long, is in practice almost excluded. A frying time of 5 to 10 minutes is in general sufficient, but a longer frying time is not detrimental. The risk that a quantity of fried product is obtained which is a failure, is therefore substantially eliminated.

It is a further advantage of the process according to the invention that the fried product bodies, such as chips, are homogeneous in color, i.e. that they all have practically the same color. If the product is potatoes, the latter are first prepared by peeling, removing the eyes and the discolored and unsound parts, and cutting them in the desired form, such as slices (for chips) or sticks. Subsequently the cuttings are washed with cold water so as to remove the starch that has been liberated from the cells during cutting.

The process is carried out by pre-frying the product bodies in oil at a temperature of 110° to 190°C. usually of about 160° to 170°C. until the product has obtained the desired golden brown color and its moisture content is 5–20 percent by weight. In practice the frying is usually effected in a continuous cooker. After this, it is possible to introduce the pre-fried product, in a metal basket, into oil at a temperature not exceeding 100°C. after which the pressure is reduced to the desired value and the frying is continued until the product has a moisture content not exceeding 2.5 percent by weight. By means of a few simple trial tests it can easily be determined how long the frying must be continued at a given temperature of the oil and a given moisture content of the pre-fried product. After the termination of the second stage of the frying process, the product must first be removed out of the oil before the pressure is raised to 1 atmosphere again. In this way an excessive fat content of the finished product is prevented.

For the evaluation of the color of the fried product essentially visual methods are applied, use being made of standard samples. The evaluation of the color is expressed in a scale from 1 to 10, in which 10 refers to a very light-colored product, while 1 indicates a brown-black product. A color 5.5 is just permissible from the viewpoint of salability. A color 8 may be considered the optimum; in this case the product has an attractive color as well as a pleasant flavor. Products with a color value above 8 have too little flavor. At a color value below 8 and in particular below 5–6 the flavor is also less good. The flavor is judged by a number of trained test persons.

The frying of pre-fried product bodies, such as potato cuttings, in oil under reduced pressure can take place in an oven, consisting according to the invention, of a closed housing with at least one supply sluice and at least one discharge sluice for the supply of the cuttings to and their discharge from the oven, a suction pipe for sucking off mainly water vapor from the oven and maintaining reduced pressure in the oven, conveyor means for moving the product bodies in the direction of the discharge sluice and for pushing the product bodies into the oil, means for taking the product out of the oil before it enters the discharge sluice and means for the supply discharge and circulation of the oil.

Since in the second phase oil is used as the heating medium, it is mainly water vapor which has to be aspirated off in order to maintain a reduced pressure in the oven. The quantity of this water vapor is relatively small, so that in contrast to the use of air as the heating medium a small power consumption is necessary for the maintenance of the desired reduced pressures. Oil has the advantage that it can absorb many calories per unit of volume while no oxidation of the oil in the product bodies takes place.

The power consumption for the maintenance of reduced pressure in the oven will be low in particular if the aforementioned suction pipe is connected to a condenser, condensed water occupying a considerably smaller volume than water vapor.

There are preferably separate means for the circulation of oil in the direction of movement of the product bodies and separate means for the circulation of oil transversely to the direction of movement of the product bodies. Thus a uniform distribution of the supplied heat is achieved, while the longitudinal circulation at the same time causes a uniform movement of the product bodies.

The invention further also provides an efficient construction of the oven sluices, which does not involve any risk of the pulverization of the product bodies during the opening and closing of the sluice lids.

EXAMPLE 1

Potatoes of the Bintje variety with a reducing sugar content of 1.20 percent by weight, calculated on solids, were peeled, the eyes and discolored parts were removed, and then the potatoes were cut into slices each having a thickness of 1.20 mm. The slices were washed in cold water for 2 minutes.

170 parts by weight of these slices were fried at 170°C. in 7,000 parts by weight of peanut oil until they had acquired a color 8. This was the case after 72 seconds. The moisture content of the product was then 17.2 percent by weight.

The pre-fried product was put into a metal wire basket which was then immersed in an oil bath having a temperature of 90°C. contained in a vacuum tank which was brought under a pressure of 60 mm of mercury absolute. The reduced pressure was maintained for 6 minutes. The basket with the fried product was then lifted from the oil bath. The oil was allowed to drip off for some time, after which the pressure was raised to 1 atmosphere again and the tank was then opened. The color of the product appeared to be unchanged, viz. 8, the moisture content was 1.8 percent by weight and the fat content 42.6 percent by weight.

For the sake of comparison, 170 parts by weight of the aforesaid washed slices were fried in one stage at 170°C. in 1,700 parts by weight of peanut oil until they had a moisture content of 1.8 percent by weight. The color of this fried product was 3. From the viewpoint of color and flavor the product was unfit for sale.

EXAMPLE 2

35 kg of potatoes were steamed until cooked without any water being added. They were then mixed with 10 kg of sifted wheaten flour and 55 kg of dried milled potatoes to form a homogeneous mass with a water content of 30 percent by weight. The reducing sugar content amounted to 1.10 percent by weight, calculated on the total solids content of the mixture.

The mass was extruded to form a strip having a thickness of 1.1 mm, and round slices were cut from said strip. The residues were recycled to the extrusion device.

The slices were fried in oil at a temperature of 180°C. until a golden brown color was obtained. The moisture content of the slices was reduced to 10 percent by weight during this process. Subsequently, the slices were put into a basket of metal wire and the basket was immersed in oil having a temperature of 95°C. contained in a vacuum tank which was brought under a pressure of 80 mm of mercury absolute, and the slices were fried until they had a moisture content of 1.8 percent. This process lasted four minutes. The basket, with the fried product, was then lifted from the oil to allow the oil to drain off. After the pressure had been raised to 1 atmosphere the tank was opened and the fried product taken out of it.

By way of comparison, similar slices prepared according to the process described above, fried in oil under atmospheric pressure at a temperature of 180°C. until they had a moisture content of 2 percent, afforded a rather dark brown product with an unpleasant, bitter taste.

EXAMPLE 3

Potatoes were washed, peeled, cut to slices, cooked, air-dried and ground, during which operation the cellular tissue was considerably damaged. This yielded a dry potato powder which was worked up into the following mixture:

- potato powder — 600 g
- corn starch — 300 g
- waxy maize — 300 g
- cooking salt — 30 g The mixture was turned into a homogeneous mass, after which it was kneaded with 1,050 ml of water until a doughy mass had been obtained, having a water content of 46 by weight.

The mass was extruded to form a round rod having a diameter of 2.5 cm. which was kept overnight at a temperature of 4°C. to allow the starch to retrograde to some extent. The strip was then cut into slices with a thickness of 1 mm. The reducing sugar content of the slices was 0.7 percent by weight, calculated on the total solids content of the mixture.

The slices were fried in oil at a temperature of 150°C. until they had obtained the desired light golden brown color. The moisture content of the fried product thus obtained was 12.2 percent by weight.

Subsequently the slices were fried in oil at a temperature of 90°C. under a pressure of 65 mm of mercury absolute until the moisture content was 2.1 percent by weight, in the manner described in Example 1. This took six minutes.

By way of comparison slices obtained according to the process described in this example, were fried in one stage at 150°C. in oil for four minutes. The moisture content of the fried product was 2.5 percent by weight. The color of the product was a rather dark brown and it was less palatable than the fried product obtained according to the method of the invention.

EXAMPLE 4

0.3 parts by weight of guar gum
1.5 parts by weight of methylcellulose (Methocel 90)
94.2 parts by weight of dried mashed potato
4.0 parts by weight of cooking salt were mixed homogeneously and subsequently mixed with 200 parts by weight of water. The mixture was left to thicken until a doughy mass had been obtained. The product had a reducing sugars content of 1.15 percent by weight, calculated on the total solids content of the mixture. The mass was extruded into a square rod having a cross-section of 3 × 3 mm which was cut into pieces having a length of 5 cm.

The resulting sticks were fried in oil at a temperature of 180°C. until a golden brown color had been obtained. The moisture content of the fried product was 19.2 percent by weight.

Subsequently the product was fried in oil at a temperature of 90°C. under a pressure of 60 mm of mercury absolute in the manner described in Example 1, until the product had a moisture content of 2.5 percent by weight. This took eight minutes. The color of the product remained golden brown.

By way of comparison sticks extruded according to this example were fried in one stage in oil at a temperature of 180°C. until they had a moisture content of 2.5 percent by weight. The product thus obtained had a dark brown color and was unpalatable.

The drawing illustrates an oven in which the drying of pre-fried product bodies in oil under reduced pressure can take place in a large volume but with a relatively small power consumption.

Figure 1:
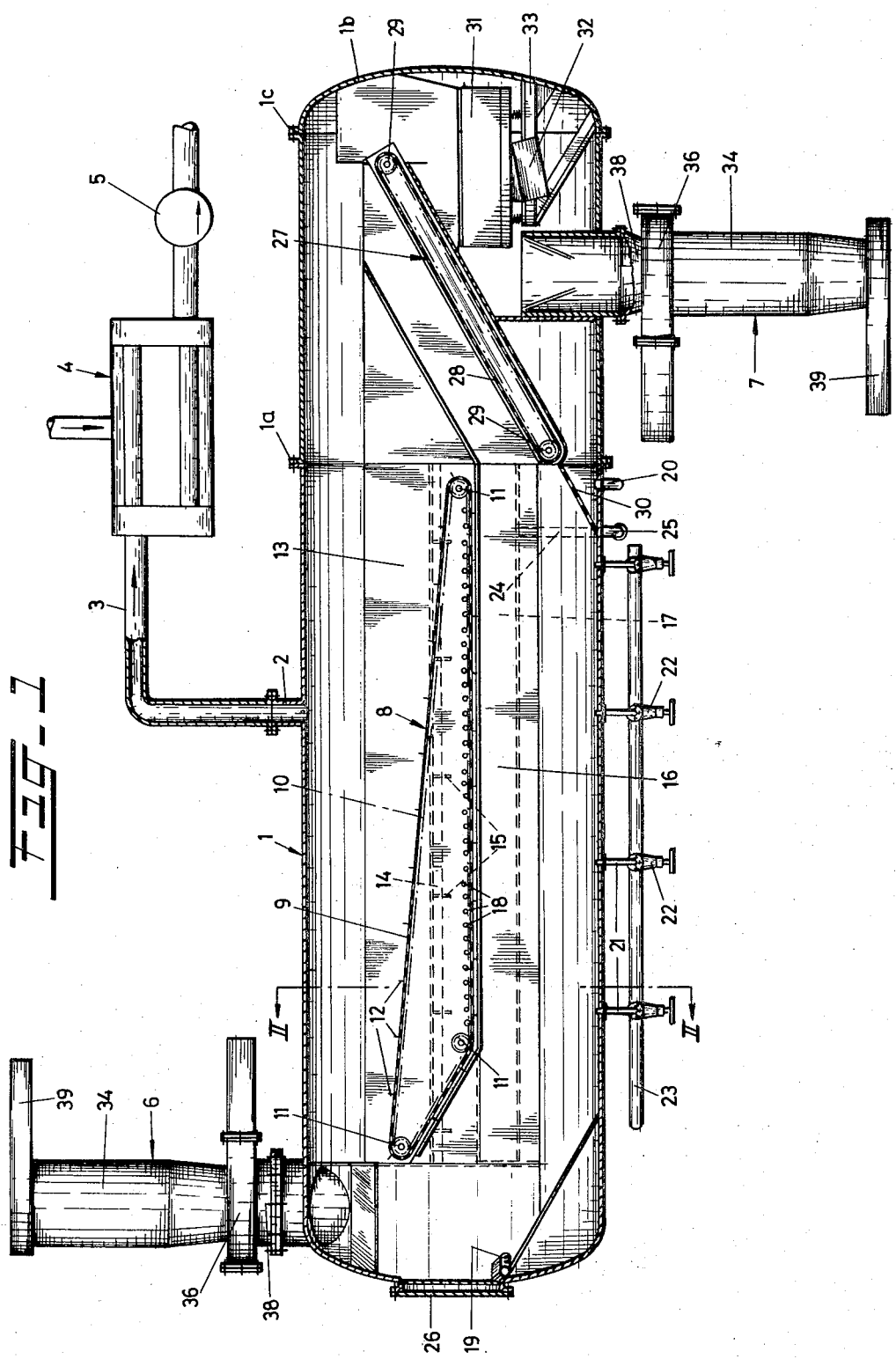
FIG. 1 shows a longitudinal section of the above-mentioned oven.

The oven shown in the drawing comprises a closed housing 1 with a suction connection 2, which is connected via a pipe 3 to a condenser 4 and a vacuum pump 5.

At the upper left portion of the oven there are provided two supply sluices 6 and at the right lower or bottom portion one discharge sluice 7 for the supply and discharge respectively of the product bodies, for example, potato cuttings.

Inside the oven a conveyor 8 is located, consisting of a flexible grate 9, which is stretched between two chains 10. The chains 10 pass over sprocket wheels 11 connected in pairs, of which at least one is driven by a motor not shown in the drawing. Carriers 12 are attached at certain distances between the chains. The sprocket wheels 11 are supported on longitudinal plates 13, which rest via longitudinal flanges 13a welded thereto on L-beams 14, which are secured via brackets 15 to the inner wall of the housing 1.

Fitted on either side of the conveyor 8, on its underside, are plates 16 which form longitudinal channels 17 with the inner wall of the housing 1. Above the upper edge of the channel plates 16 openings 18 are present in the lower edge of the plates 13; see FIG. 1.

The oven further comprises means for the longitudinal circulation of oil and means for the transverse circulation of oil. The oil circulation is intended in particular to cause a uniform distribution of the supplied heat.

The first-mentioned means consist of an oil supply pipe 19, provided with openings and located on the left side wall of the oven and of an oil discharge pipe 20 debouching into the underside of the oven.

The means for the transverse circulation of the oil consist of a number of supply pipes 21 debouching into the underside of the oven, each of which pipes being connected via a valve 22 to a main supply pipe 23. The supplied oil flows via the openings 18 into the longitudinal channels 17 and thence is sucked off via the pipes 24, which debouch into the channels near the end of the conveyor 8 turned towards the discharge end of the oven, and are connected with a main discharge pipe 25.

In the left wall of the oven a door 26 is mounted, which shuts off a manhole.

The edible product bodies, e.g. potato cuttings fed via the sluices 6 to be described below, drop into the oil. In the operating position the level of the mixture of vapor bubbles, product bodies an oil is slightly above the level of the lower part of the conveyor 8. The product bodies are pressed into the oil (at a temperature below 100°C.) by this lower part, and by means of the carriers are moved in the direction of the discharge sluice 7. The longitudinally circulating oil ensures that during the movement the product bodies remain uniformly distributed and do not accumulate in front of the carriers. As to the distribution of the heat, the transverse circulation is most important.

By the pump 5 a vacuum is produced to an absolute pressure not exceeding 500 mm of mercury absolute. A considerable portion of the water in the pre-fried cuttings will evaporate at that pressure.

From the oven mainly water vapor, which liquefies in the condenser 4, is discharged. Since the heating of the product bodies is effected with the aid of oil, a great many calories can be supplied per unit of volume, which is an important advantage over air as the heating medium. The use of this latter medium moreover would present the disadvantage that for the maintenance of the vacuum large quantities of air must be removed, which naturally involves a considerable power consumption. Again, when oil is used as the heating medium, oxidation of the oil in the product is excluded, in contrast to the use of air as the heating medium. The product bodies conveyed to the right in FIG. 1 by the conveyor 8 arrive with a considerably reduced water content (not exceeding 2.5 percent by weight) on an inclined conveyor 27, which like conveyor 8 consists of an endless grate belt 28, which is stretched between chains passed over sprocket wheels 29. In order to prevent the product bodies moving to a position beneath the inclined conveyor 27, an oblique grate 30 is provided between the beginning of the conveyor 27 and the jacket of the oven housing 1.

The inclined conveyor 27 conveys the product bodies obliquely upwards until they drop on to a vibrating frame 31, which is driven by a vibrator 32. The vibrating frame 31, which is resiliently mounted on a support 33 connected to the housing 1 conveys the product bodies periodically to the discharge sluice 7. The vibrating frame may of course be replaced by a different conveyor which is adapted to take up the product bodies during its standstill period and to deliver the product bodies to sluice 7 during its active period.

Each of the sluices 6, 7 consists of a first vertical tube 34, of which the end 35 (FIG. 3) directed towards the oven is secured to a flat closed box 36, in which a lid 37 is horizontally movable between a position in which the tube passage is shut off and a position in which said passage is free. Connected to the box 36 in the axial extension of the tube 34 is a second tube 38, which debouches into the oven and is fixed to the oven. The other end of the first tube 34 is fixed to a box or plate 39, in which likewise a lid 37 is movable between a closed position and an opened position.

Figure 2:
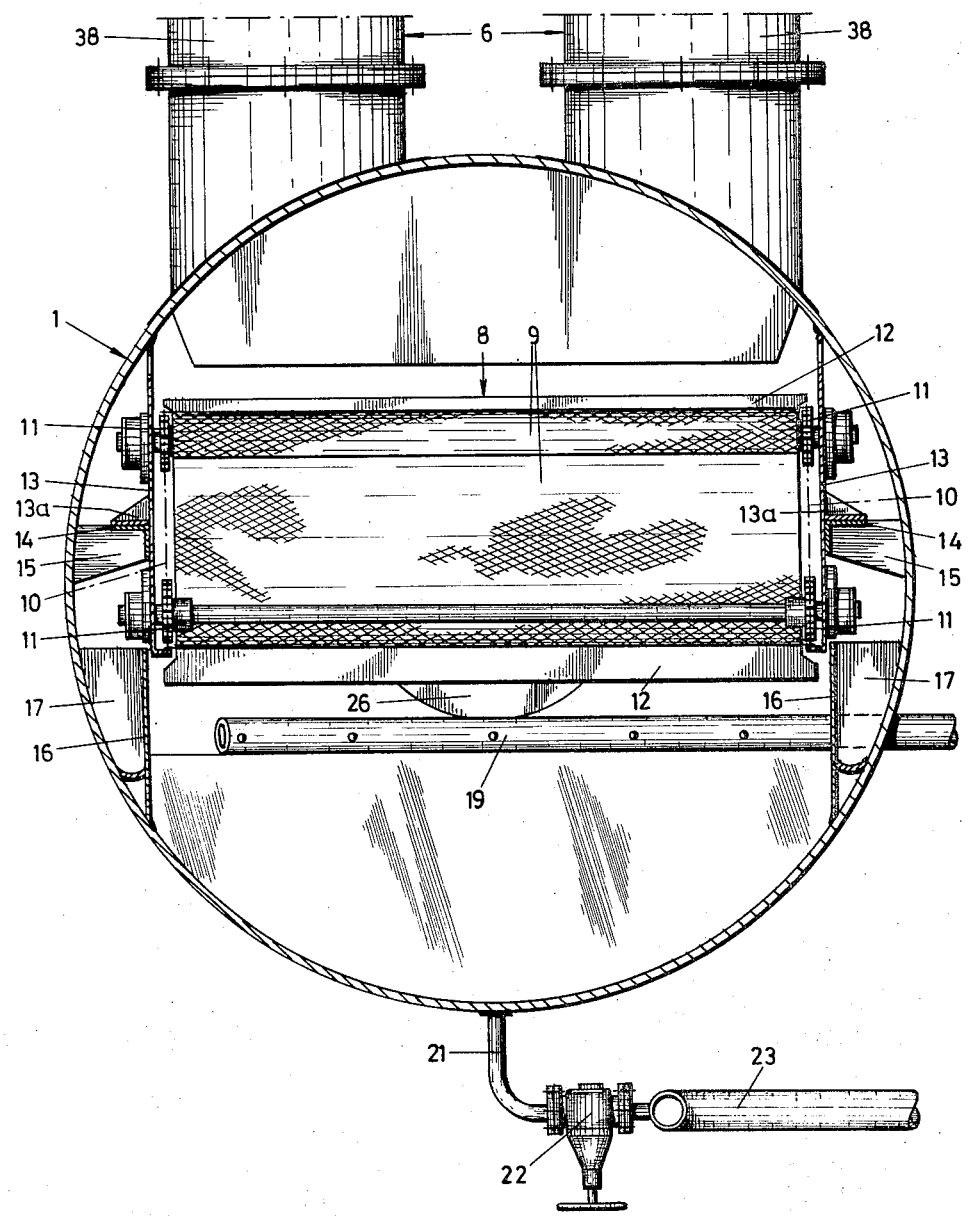
FIG. 2 shows a cross-section along the line II—II in FIG. 1 on an enlarged scale.
Figure 3:
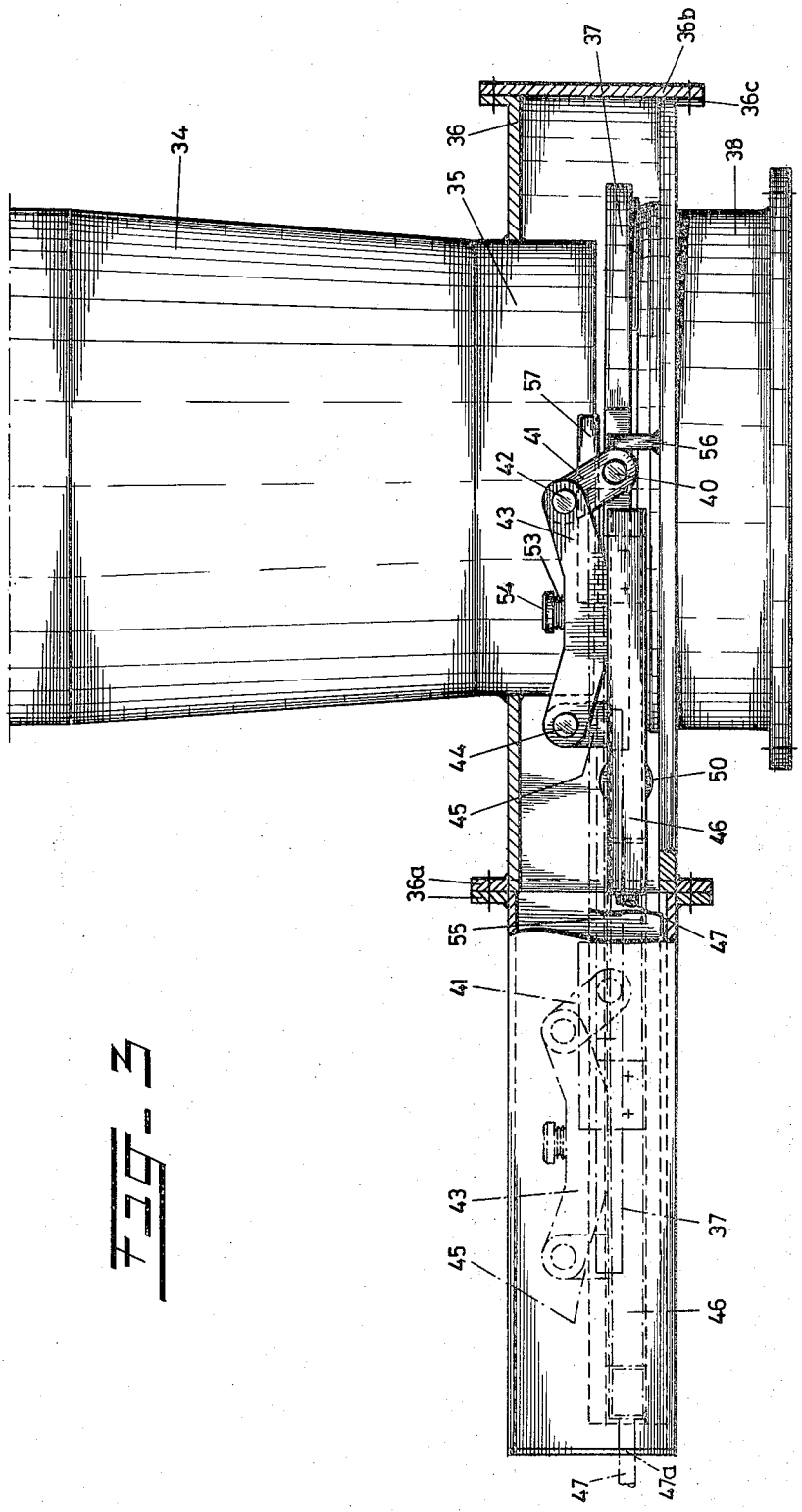
FIG. 3 shows a side view of a sluice lid and its operating mechanism.
Figure 4:
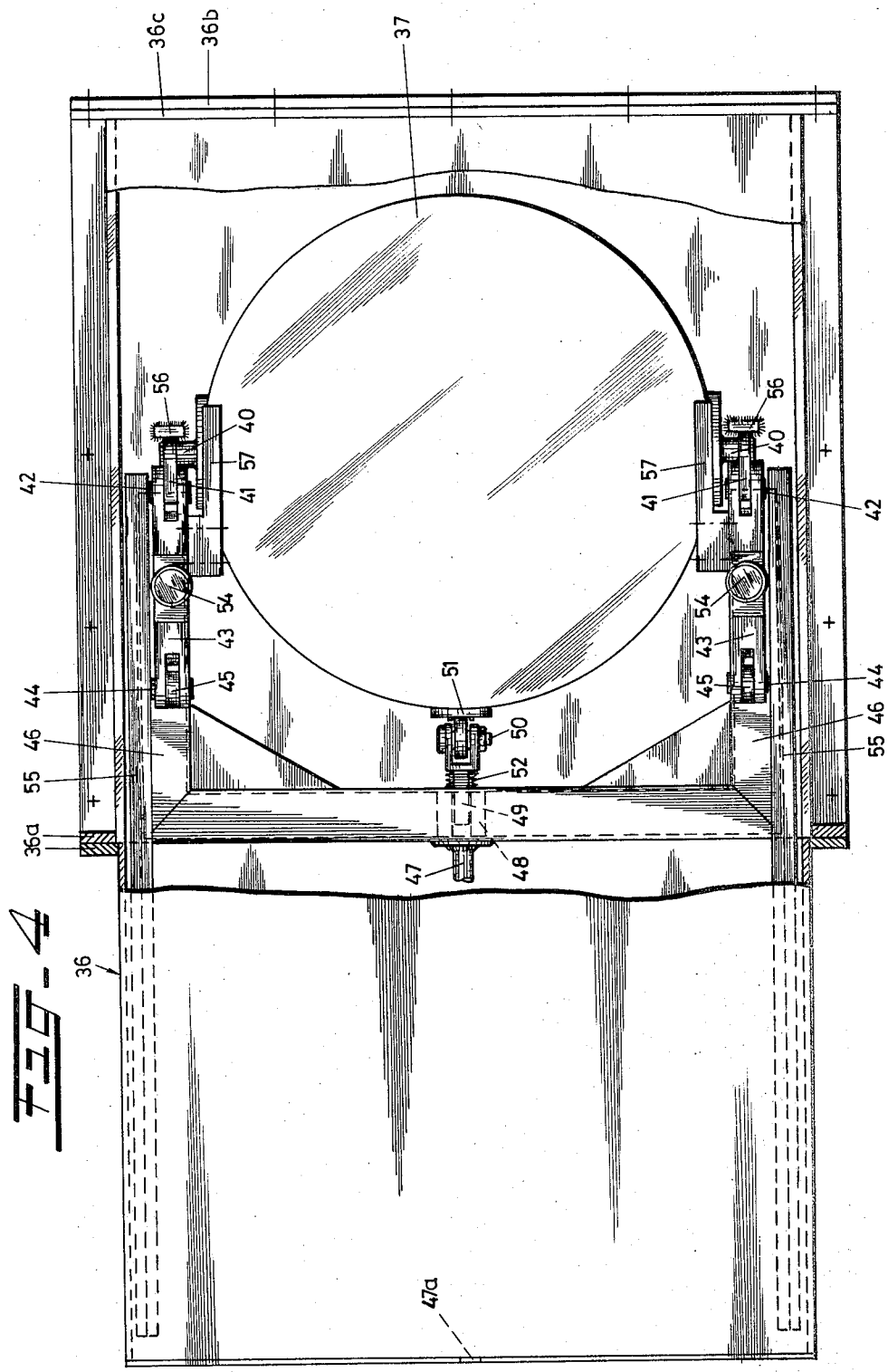
FIG. 4 shows a plan view of the mechanism according to FIG. 3.

Since the lids 37 and the operating mechanisms of all the sluices have substantially the same construction, it is sufficient to describe the sluice lid on the underside of the supply sluice 6, as shown in FIGS. 3 and 4 in elevation and plan, respectively. FIG. 3 is an elevation viewed from the right in FIG. 2. The closed flat box 36 is cut through.

The lid 37 consists of a round disc with two diametrically opposed trunnions 40, each of which is supported in the lower end of a first lever 41, the upper end 42 of which is rotatably connected with the end of a horizontal second lever 43. The other end 44 of the second lever 43 is rotatably supported in a short upright 45, which is firmly connected with a horizontal U-frame 46.

Secured to this U-frame 46 is the end of a piston rod 47 to be operated by a pneumatic cylinder not shown in the drawing. The piston rod extends tightened into the box 36 and 47a.

Provided in the extension of the piston rod 47, in the U-frame 46, is a bore 48, in which a short rod 49 is movable. The end of this short rod 49 directed towards the round lid 37 is forked and rotatably supports a roller 50, which is adapted to engage a face 51 fixed to the lid. Between the said forked end of the rod 49 and the U-frame 46 a first spring 52 is present. Each of the horizontal second levers 43 is urged downwards by a second spring 53, which engages a head 54 secured to the U-frame 46.

The U-frame 46 is guided in U-shaped rails 55, which are fixed in the flat box 36 near the side walls thereof.

Welded on the bottom of the flat box 36 in the path of movement of the first levers 41 are stops 56.

It will be obvious that the lid 37 is pushed off the U-frame 46 by the first spring 52, the first levers 41 taking an oblique position in the opened position of the lid 37 shown in FIG. 3 in lines of dots and dashes.

If the lid 37 is to be placed in the closed position, the piston rod 47 is moved to the right, while the U-frame 46, guided in the U-shaped rails 55, is taken along. When the first levers 41 come into contact with the stops 56, the lid 37 is a few millimeters above the opening of the tube 38 to be shut off. As the piston rod 47 is pressed further to the right the short rod 49 moves further into the bore 48, the first spring 52 being depressed. The points of engagement between the first levers 41 and their stops 56 move downwards against the action of the first spring 52, in consequence of which said levers 41 take up a less oblique position and the round lid 37 moves vertically downwards until a round strip of the lid 37 (not shown) consisting of rubber, for instance, sealingly engage an edge at the top of the tube 38 to be shut off.

The pivots 42 between the first and second levers (41 and 43, respectively), will move upwards over a short distance against the action of the second springs 53.

With the construction described above it is thus ensured that the lower edge of the lid 37 during its horizontal displacement reaches a level which is a few millimeters above the upper edge of the tube 38 to be shut off, by which means the above-mentioned sealing strip is prevented from being damaged. As soon as the lid 37 takes up the correct position above the tube 38, the vertical movement of the lid 37 commences. In the closed position the lid is firmly pressed by the springs 52, 53, which engage the U-frame 46. The closing pressure is uniformly distributed. It is noted that the springs 53 are not essential for the closing and opening movements of the lid.

Opening the lid 37 takes place in the reverse order, the springs 52, 53 expanding owing to the movement of the piston rod 47 to the left, and the lid 37 first rises vertically upwards and then moves horizontally along with the piston rod 47.

Provided near the trunnions 40 above the lid 37 are stops 57, by which means it is ensured that the lid 37 can pivot only through a small angle.

It is an advantage of the described operating mechanism for a sluice lid that is always outside the stream of material, so that the product bodies cannot cause fouling of the mechanism and no pulverization or pinching of the product bodies can take place. This latter in contrast to rotary sluices, in which case pinching-off of fragments of material would be inevitable.

Lid 37 of the discharge sluice will also have its closing movement in the direction of the oven housing, that is to say upwards, as in that case the atmospheric pressure will urge the lid on its seating.

It is observed that just before the closing of the upper lid of the discharge sluice 7 the vibrating conveyor 31 is stopped. The operation of the inclined conveyor 27, however, is not interrupted. The vibrating frame therefore serves as a kind of buffer, i.e. owing to its relatively large volume during the stand-still periods it can take up product bodies and deliver the latter uniformly during the operative periods.

In order to avoid pulverization of the product bodies it is further important for the lower end of the tube above a lid to have a smaller diameter than the upper end of the tube beneath said lid; thus in the supply sluice 6 the lower end 35 of the tube 34 has a smaller diameter than the upper end of the tube 38, whilst in the sluice 7 the lower end of the tube 38 has a smaller diameter than the upper end of the tube 34. The tube ends with a smaller diameter taper conically. To ensure an undisturbed flow of the product bodies, the cone angle of the conical tube ends should be smaller than 15° preferably smaller than 10°.

It will be obvious that the supply and discharge of the product bodies via the sluices takes place in the following order: the upper lid is opened, a quantity of product bodies is introduced into the tube 34, the upper lid is closed, in the space between the two lids a vacuum is produced, the lower lid is opened, the product bodies drop out of the sluice, the lower lid is closed, into the space between the lids air is admitted, and then the upper lid can be opened again. In connection with the power consumption it is useful to use a separate pump for the production of the vacuum.

By the provision of a sealable bypass between two or more sluices it is possible to limit further the power consumption for the production of a vacuum in a sluice chamber, because at the moment when there is a vacuum in one sluice chamber, and a vacuum must be produced in the other, the two sluice chambers are connected with each other; thereafter the connection is broken again, upon which in the sluice chamber to be evacuated a further vacuum is produced and the other sluice chamber is connected with the atmosphere.

The flat box 36, in which the lid 37 is present, consists of two parts which are fastened against each other with flanges 36a. The box is shut off at one end by an end plate 36b, which is fastened against flanges 36c of the box.

After removal of the plate 36b and/or disengagement of the flanges 36a the interior of the box can easily be cleaned and, if necessary, repaired.

The housing 1 of the oven is also divided, and at one end is provided with an end plate. The flanges which connect the two parts of the housing 1 with each other are designated by 1a, and the shut-off plate by 1b, which is fastened against a flange 1c.

After disengagement of the flanges 1a the conveyor 8 can be pulled out of the housing 1 by shifting of the flanges 13a over the L-beams 14 in order to be cleaned and, if necessary, repaired. The conveyor 27 and the like, too, are readily accessible in this way.

Figure 5:
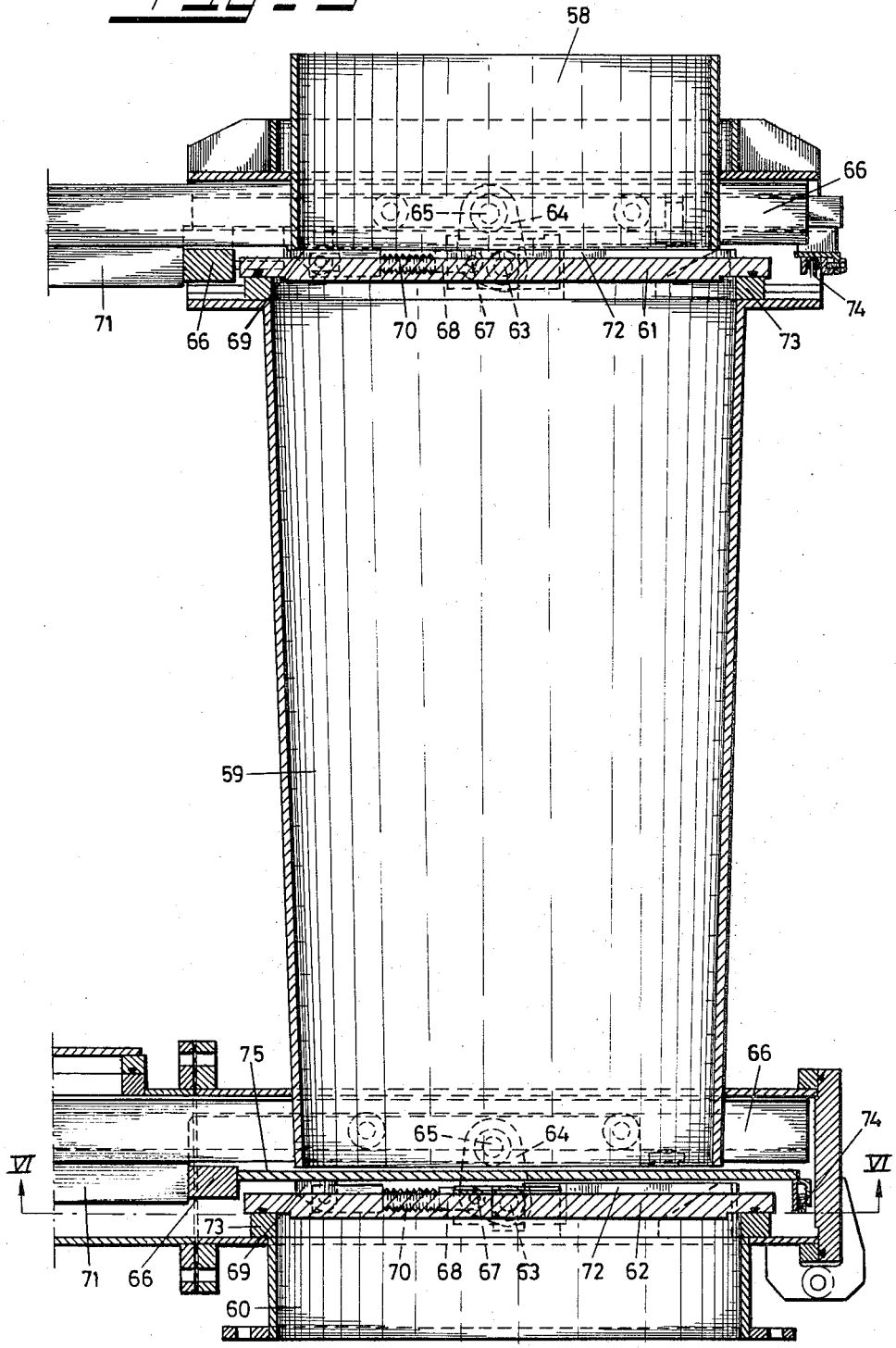
FIG. 5 shows a longitudinal section of an alternative construction of a supply sluice.
Figure 6:
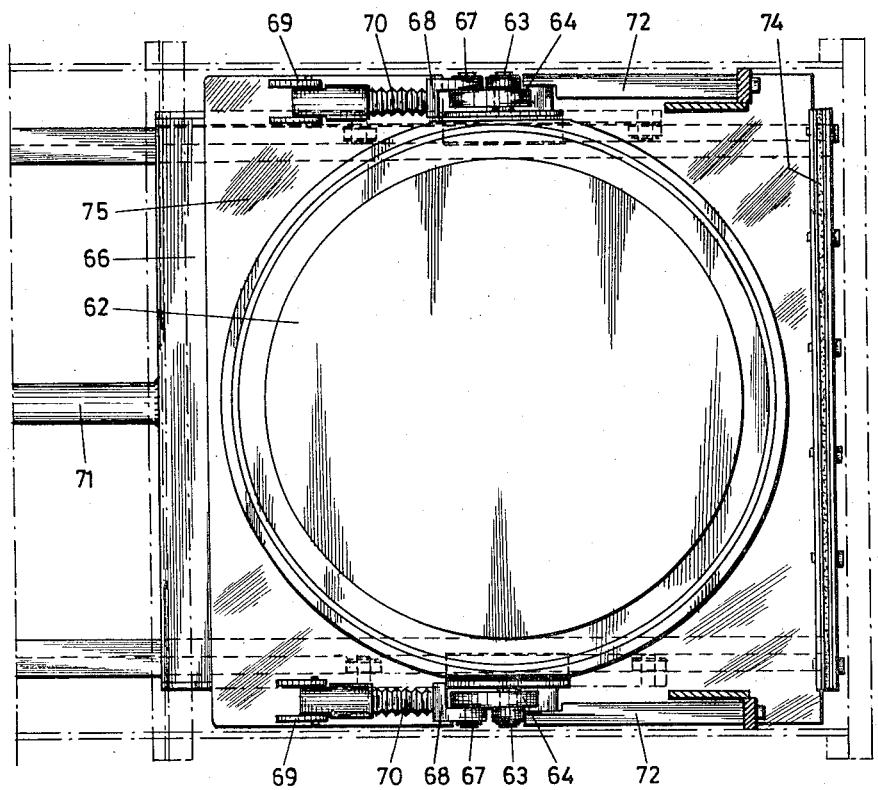
FIG. 6 shows a cross section along the line VI—VI in FIG. 5.
Figure 7:
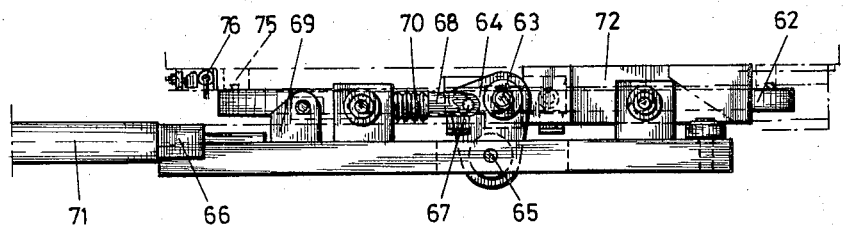
FIG. 7 shows one of the lids and operating mechanisms of an alternative construction of a discharge sluice.

The sluices according to FIGS. 5, 6 and 7 comprise means to prevent the edible product from causing leakage of the sluices and from blocking the movable lid parts.

The supply sluice according to FIG. 5 comprises an upper inlet tube 58 terminating a short distance above a middle tube 59 which in turn, ends a short distance above a lower tube 60. Between tubes 58 and 59 an upper lid 61 is movable between a position in which the upper side of tube 59 is shut off and a position in which said upper side is free. Between tubes 59 and 60 a lower lid 62 is movable between a closed position and an opened position.

Both lids 61 and 62 consist of a round disc having at two diametrically opposed places a pivot connection 63 with a tumbler 64. Further, each of the tumblers has a pivot connection 65 with a square frame 66 and a pivot connection 67 with an L-piece 68. Each of the L-pieces is pivotally connected to an upright 69, whereby between L-piece 68 and upright 69 a number of dish shaped springs 70 are disposed.

The end of a piston rod 71 is secured to the frame 66. The piston rod 71 is operated by a pneumatic cylinder not shown in the drawings.

In the closed position of the lid, the tumblers 64 are pressed against a stop member 72. When the piston rod 71 is moved to the left to bring the lid to its open position, the springs 70 are released whereby the tumblers 64 are turned and the lid is vertically moved from its seat. After releasing of the springs 70, the lid is horizontally displaced in the direction of the piston rod 71.

To place the lid in the closed position the piston rod 71 is moved to the right. When the tumblers 64 come in contact with the stop members 72, the lid is a few millimeters above the opening to be shut off. As the piston rod 71 is pressed further, the springs 70 are depressed and the tumblers 64 are turned in such a way that the lid moves vertically until a round rubber strip of it engages the seat 73 at the edge of the opening to be shut off.

The constructions according to FIGS. 5, 6 and 7 are especially advantageous, in that they provide means which prevent the edible product from getting between the lid and its associated seat, where it would be compressed, and prevent a tight seal of the sluice and also block the moving parts. Therefore, the supply sluices comprise a number of bristles 74 which are connected to the frame 66. When the lids are moved to the open position, the bristless sweep the seats 73 clean. In addition, above the lower lid 62 of the supply sluice a plate 75 is secured to the frame 66 on which plate the edible product, supplied in the supply sluice, will rest. When the lid is moved to the open position, the product is wiped off by the lower edge of the tube 59.

In the discharge sluices according to FIG. 6 in which the seats 73 are above the lids 61, 62, a number of fixed bristles 76 are secured adjacent the seats, along which bristles the lids are moved during opening and closing of the latter.

I claim:

1. An oven for the further frying of pre-fried product bodies under reduced pressure, comprising a closed housing with at least one supply sluice and at least one discharge sluice for the supply and discharge of said product bodies into and from said housing, means for closing said sluice, suction means for aspirating water vapor from said oven and for maintaining a reduced pressure in said oven when said sluices are closed, conveyor means for moving product bodies in the direction of said discharge sluice and for pushing said product bodies into oil contained in said housing, means for removing said product bodies from said oil before they enter said discharge sluice and means for the supply, discharge and circulation of said oil in said housing.

2. The oven of claim 1 which further comprises means for circulation of said oil in the direction of movement of said product bodies and separate means for circulating said oil in a direction transverse to said direction of movement of said product bodies.

3. The oven of claim 2 which comprises channels parallel to the direction of movement of said product bodies overflow means in said channels for conveying oil from the lower portion of said oven into said channels and oil discharge pipes for removal of the oil from said channels.

4. The oven of claim 2 wherein said conveyor means comprise a first belt conveyor formed by a grate with carriers stretched between two endless chains, and a second belt inclined obliquely upward from the discharge end of said first belt and discharging above a third conveyor, the discharge end of which is located above the discharge sluice (7).

5. The oven of claim 2, in which each said sluice comprises a first tube, the end of which directed to the oven housing is secured to a closed box, a second tube one end of which opens into and is secured to said housing and the other end of which is secured axially with respect to said first tube to said box, a lid at each end of said first tube, said lids being removable between a position in which the passage through said tube is shut off and a position in which said passage is open, each of said lids having two diametrically opposed trunnions rotatably connected with one end of a lever the other end of which lever is pivotally connected with a U-frame engaged by a piston rod, a spring on an extension of said rod between said lid and said U-frame, stops in the path of movement of said levers such that when said levers engage said stops, said lid is above said tube opening and in consequence of the displacement of said U-frame against the action of said spring, said lid moves vertically in the direction of the housing to the closed position.

6. The oven of claim 5, wherein the lower end of each tube tapers to a diameter smaller than the diameter of the upper end of said tube, the cone angle of the conical tube portion being less than 15°.

7. The oven of claim 6, wherein the upper ends of said levers are each pivotally secured to one end of a horizontal lever, the other end of which is pivotally connected to said U-frame, said horizontal levers being spring urged in the direction of said housing.

8. The oven of claim 1, which also comprises a sealable by-pass between at least two of said sluices.

* * * * *